United States Patent
Kelson (10) Patent No.: US 10,625,399 B1
(45) Date of Patent: Apr. 21, 2020

(54) METHOD TO RECLAIM METAL FROM INSULATED AND/OR SHIELDED AND/OR JACKETED POWER CABLES USING WATERJETTING

(71) Applicant: Arnold A. Kelson, Papillion, NE (US)

(72) Inventor: Arnold A. Kelson, Papillion, NE (US)

(*) Notice: Subject to any disclaimer, the term of this patent is extended or adjusted under 35 U.S.C. 154(b) by 287 days.

(21) Appl. No.: 15/731,635

(22) Filed: Jul. 11, 2017

Related U.S. Application Data (60) Provisional application No. 62/495,979, filed on Sep. 30, 2016, provisional application No. 62/493,729, filed on Jul. 15, 2016.

(51) Int. Cl.

| | | |
|---|---|---|
| *B24C 3/08* | (2006.01) | |
| *B24C 1/04* | (2006.01) | |
| *B26F 3/00* | (2006.01) | |
| *B29B 17/02* | (2006.01) | |
| *B29C 63/00* | (2006.01) | |
| *B24C 9/00* | (2006.01) | |
| *B08B 3/02* | (2006.01) | |

(52) U.S. Cl.
CPC .............. *B24C 3/081* (2013.01); *B24C 1/045* (2013.01); *B26F 3/004* (2013.01); *B29B 17/02* (2013.01); *B29C 63/0013* (2013.01); *B08B 3/02* (2013.01); *B24C 9/00* (2013.01)

(58) Field of Classification Search
CPC ........... B24C 3/081; B24C 1/045; B24C 9/00; B29B 17/02; B26F 3/004; B29C 63/0013; B08B 3/02
See application file for complete search history.

(56) References Cited

U.S. PATENT DOCUMENTS

| | | |
|---|---|---|
| 4,064,884 A | 12/1977 | Asp |
| 4,281,444 A | 8/1981 | Smith |
| 4,593,772 A | 6/1986 | Kelley |
| 4,854,891 A | 8/1989 | Hashish et al. |
| 5,142,950 A | 9/1992 | Takano et al. |
| 5,904,461 A | 5/1999 | Ciniglio et al. |
| 5,904,610 A | 5/1999 | Ciniglio et al. |
| 6,130,404 A | 10/2000 | Campagna et al. |
| 6,273,790 B1 | 8/2001 | Neese et al. |
| 6,905,391 B2 | 6/2005 | Miller et al. |
| 7,680,428 B2 | 3/2010 | Sakato et al. |
| 7,993,470 B2 | 8/2011 | West et al. |
| 2010/0213106 A1 | 8/2010 | Ben |

*Primary Examiner* — Robert J Grun
(74) *Attorney, Agent, or Firm* — James D. Welch (57) ABSTRACT

Methodology for reclaiming metal from insulated and/or shielded and/or jacketed power cables present on supporting conveyor belt and/or troughs, by waterjetting using stationary and/or spinning nozzles.

18 Claims, 8 Drawing Sheets

METHOD TO RECLAIM METAL FROM INSULATED AND/OR SHIELDED AND/OR JACKETED POWER CABLES USING WATERJETTING

This Application Claims Benefit of Two Provisional Applications, Ser. Nos. 62/493,729 Filed Jul. 15, 2016 and 62/495,979 Filed Sep. 30, 2016.

TECHNICAL FIELD

The present invention relates to methodology for reclaiming metal from discarded cables, and more particularly to a method for reclaiming metal from power cables supported by conveyor belts and/or troughs, by waterjetting using stationary and/or spinning nozzles.

BACKGROUND

The use of waterjetting to cut through materials, and to remove materials from other materials is well known. For instance see U.S. Pat. No. 8,540,552 to Reukers; U.S. Pat. No. 8,892,236 to Olsen; U.S. Pat. No. 9,003,936 to Chillman et al.; U.S. Pat. No. 4,761,039 to Hilaris; U.S. Pat. No. 4,825,936 to Ruhle; U.S. Pat. No. 5,411,432 to Wyatt et al.; U.S. Pat. No. 5,927,329 to Yie; U.S. Pat. No. 6,379,214 to Stewart et al.; U.S. Pat. No. 6,571,665 to Julien and U.S. Pat. No. 7,047,857 to Adkins. Patents to Kelson, U.S. Pat. Nos. 9,168,634 and 8,007,563 are also very relevant. The 634 patent being to a method of removing insulation from tangles of wires or the like, and the 563 patent being to a method of removing jacket and wire coating materials from cables comprising a plurality of coated wires.

Even in view of the known prior art, however, need remains for a method that efficiently can reclaim metal from insulated and/or shielded and/or jacketed cables that had been applied to carry power before their retirement.

DISCLOSURE OF THE INVENTION

The present invention is a method of reclaiming metal from power cables. To begin, it is to be understood that power cables generally comprise:
  a central metal core;
  an inner sheath which is firmly affixed to said central metal core;
  an outer sheath which is loosely affixed to said inner sheath.

Said power cable can optionally comprise metal sheathing in said outer sheath, and/or between said inner and outer sheaths.

A first basic approach for removing sheathing, both metal and non-metal, present on power cables in the present invention provides that said power cable is to:
  1) simply simultaneously subject an intact power cable to waterjetting from a plurality of directions, with sufficient force that all sheathing is removed, leaving a metal core. In this approach it has been found that use of two or more nozzles, (eg. it is suggested that spinning waterjet nozzle systems that are caused to rotate about a locus located essentially centrally therein would work well), oriented so as to cause water to impact a power cable from two or more locations around a power cable circumference at 20,000 PSI, while said power cable and waterjet nozzles are caused to move at about three feet/minute with respect to one another, can directly remove essentially all sheathing, both metal and non-metal, from a power cable, leaving a metal core. This includes both loosely present plastic sheathing, and sheathing that is more securely bonded to a metal core. This approach has been found to work well, especially when spinning nozzles are used. However, as some sheathing is often metallic, it must be appreciated that this approach will simply lump removed metal sheathing with non-metallic sheathing. This approach therefore, while simple to practice, has a drawback in that some metal which could be salvaged will typically be lost when the removed sheathing is discarded, unless an extra effort is made to capture it.

A modified approach that overcomes the identified problem of sacrificing metallic sheathing involves that a preliminary waterjet procedure be performed that applies waterjets from two typically round nozzles at essentially opposite sides of a power cable to score through to the metal core. Note, this can be modified to involve three or more such typically round nozzles oriented to cause waterjets therefrom to impact the at multiple locations around the circumference of said power cable. The result is that the present sheathing, both that loosely and firmly affixed to the inner metal core, is scored all the way through to the metal core. Loosely attached metallic and non-metallic sheathing is then easily removed. This preserves metallic sheathing that can be relatively easily separated from the simultaneously removed non-metallic sheathing, thereby salvaging metal which is lost in the first basic approach described above. It is to also be noted that the remaining firmly attached sheathing will be present as effective strips along the length of the power cable, each said strip being between scored regions. With said loosely attached sheathing thus removed, one can then approach removal of the remaining tightly attached sheathing an approach selected from the group:
  1') performing a procedure as was just described in the first basic approach—that being by use of two or more waterjet nozzles, (eg. spinning nozzle systems), oriented so as to cause water to impact a power cable from two or more locations around a power cable circumference at 20,000 PSI, while said power cable and waterjet nozzles are caused to move at about three feet/minute with respect to one another to directly remove essentially all remaining tightly affixed sheathing from a power cable, leaving a metal core; and
  2) application of oblique angle fan-jet shaped water jets as provided from fan-jet shaped nozzles, said fan-jets of water being directed at the interface region between the remaining firmly affixed sheathing and the metal core. This involves applying one fan-jet shaped jet of water to each "strip" that is present along the length of the remaining parts of the power cable so that each strip is removed from the metal core.

Approaches 1 and 1' are very straight forward in that they involve simply causing multiple waterjets, (eg. from a spinning nozzle system), to simultaneously impact a power cable from multiple directions at sufficient pressure for a sufficient amount of time that sheathing impacted is removed by a sort of brute-force approach. And, while not a limitation, it is noted that spinning waterjet nozzles are often preferably applied in these embodiments.

A method that embodies the 1 and 1' approach to reclaiming metal from power cables comprising the steps of:
  a) providing a sequence of a selection from the group consisting of:
    at least first and second conveyor belts, each having an supporting surface and each having an entry and an exit end, said the exit end of one of said at said least two conveyor belts being separated from the entry end of the second, so that a gap region exists therebetween; said system of at least first and second conveyor belts including means for causing a power cable placed upon the supporting surfaces thereof to move; and at least first and second cable trough supports, each having a supporting surface and each having an entry and an exit end, said the exit end of one of said at said least two cable supports being separated from the entry end of the second, so that a gap region exists therebetween, said system of at least first and second cable guides further comprising a power cable gripper that enables exerting motion causing force to a cable via pulling, and/or driving said cable by way of force applied thereto by at least one driver wheel, and/or pushing said cable over said at least first and second conveyor belts or cable trough supports;

such that in use said selection can be caused to move a power cable placed on the supporting surfaces thereof to move over said gap region;

providing a power cable comprised of:
  a central metal core;
  an inner sheath which is firmly affixed to aid central metal core; and
  an outer sheath which is loosely affixed to said inner sheath;
  said power cable optionally comprising metal shielding in said outer sheath, and/or between said inner and outer sheaths; and
providing at least two waterjet nozzles positioned in said gap between said exit and entry ends of said sequentially oriented at least first and second conveyor belts/troughs so that in use they can be made to eject waterjets that enter into said gap region.

Said method continues with:
b) placing said power cable on said supporting surface of said at least first conveyor belt or cable trough support, such that a leading portion thereof is atop said first conveyor belt or first cable trough support, and a portion thereof extends into said gap region and optionally extends onto the supporting surface of the second conveyor belt or cable trough support;
c) causing said waterjet nozzles to eject water that impinges on said portion of said power cable that is in the gap region, to the end that inner and outer sheathing is simultaneously removed from the central metal core;
d) causing said power cable to move so that the leading end thereof projects onto, or further onto the supporting surface of the second conveyor belt or cable trough support while causing said waterjet nozzles to eject waterjets that impinge on said portion of said power cable that is in the gap region, to the end that inner and outer sheathing is removed from the central metal core; and
e) continuing step d) until a majority of said power cable has had the inner and outer sheathing removed therefrom.

Note, power cable motion can be caused by the motion of belts in a dual conveyor belt system, or by grasping one end of a power cable and pulling it over trough-like cable supports. Grasping can be accomplished by a system of tongs like those used to grasp blocks of ice, (ie. a pincer grip), for instance. Such a grasping system can provide the necessary cable gripping, but remain out of the way of applied waterjets. Additionally, drive wheels that contact a cable can be utilized both before and after non-metal components are removed for metal components in a cable.

Further, a first power cable conveyor belt or cable trough support can beneficially be positioned a bit below a vertical position with respect to the second, (cable receiving), power cable conveyor belt or cable trough support. This is because waterjets remove sheathing leaving a smaller diameter core after the gap region. The second conveyor belt or cable trough support being positioned a bit vertically higher that the first therefore is better positioned to receive it.

Said method can involve the presence of more than one gap region in which are positioned stationary or spinning nozzles.

Said method can involve that the at least one said waterjet nozzle is of a spinning type system which serves to eject two or more waterjets therefrom, said waterjet nozzles being caused to rotate during use, about a locus essentially centrally located between present nozzles.

Said method can involve that the at least one said waterjet nozzle is spin-type so as to eject waterjets therefrom that approach the power cable substantially normal to the longitudinal dimension thereof, while said waterjet nozzles rotate, (ie. spin), during use around a locus essentially central therebetween.

Said method can involve that the waterjet is ejected at 20,000 PSI, while said power cable and waterjet nozzles are caused to move at about three feet/minute with respect to one another.

While the methodology regarding the 1 and 1' approaches is thus demonstrated, the method alluded to in the approach identified as 2) above, needs better description. It is also a method of reclaiming metal from power cables but comprises the steps of:

a) providing a sequence of at least first and second conveyor belts/troughs, each having a supporting surface and each having an entry and an exit end, said the exit end of one of said at said least two conveyor belts/troughs being separated from the entry end of the second, so that a gap region exists therebetween; and
providing a power cable comprised of:
  a central metal core;
  an inner sheath which is firmly affixed to said central metal core; and
  an outer sheath which is loosely affixed to said inner sheath;
  said power cable optionally comprising metal shielding in said outer sheath, and/or between said inner and outer sheaths.

Said method continues with:
providing at least two round waterjet nozzles positioned in said gap between said exit and entry ends of said sequentially oriented at least first and second conveyor belts/troughs so that in use they can be made to eject water jets that enter into said gap region;
b) placing said power cable on said at least first conveyor belt/trough such that a leading portion thereof is atop said first conveyor belt/trough, and a portion thereof extends into said gap region and optionally extends onto the supporting surface of the second conveyor belt/trough;
c) causing said round waterjet nozzles to eject water that impinges on said portion of said power cable that is in the gap region, to the end that inner and outer sheathing are have grooves scored therethrough to the central metal core;
d) causing said power cable to move so that the leading end thereof projects onto, or further onto the supporting surface of the second conveyor belt/trough while causing said round waterjet nozzles to eject waterjets that impinge on said portion of said power cable that is in the gap region, to the end that inner and outer sheathing have grooves scored along a desired length of said power cable to the central metal core, thereby forming strips of sheathing along a length of said power cable.

At this point the method differs from that already described in that it requires:

e) removing the outer sheathing which is loosely affixed to said inner sheath and any optional metal shielding in said outer sheath, and/or between said inner and outer sheaths.

This is followed by:

g) applying a different, or modified waterjet system comprising a plurality of fan jet nozzles to provide fan shaped waterjets in the gap region, at an oblique angle to said inner sheath at the location where said inner sheath meets said central metal core, there being sufficient spacing between said plurality of fan shaped waterjet nozzles for said power cable inner sheath and central metal core to fit therebetween;

h) causing said power cable, from which has been removed said outer sheathing and into which inner sheath a plurality of grooves have been formed, to slide over said fan shaped jet nozzles and/or causing said fan shaped nozzles to move under said power cable inner sheathing, while water is caused to be jetted therefrom into said gap region, each fan shaped water jet being oriented to primarily address one said strip in said inner sheath.

The result is that said strips formed in said inner sheath are caused to be removed from the central metal core, leaving said central metal core substantially reclaimed, substantially free of outer and inner sheathing material.

Another recitation of a present invention method provides a very distinctive sequence of steps, like those in the approach identified as 2) above. It is also believed not found in any known prior art. This modified method begins with:

a) providing at least one waterjet system comprising a plurality of round jet nozzles; and     providing a different, or modified waterjet system comprising a plurality of fan jet nozzles.

The method continues with:

providing a power cable comprised of:

a central metal core;

an inner sheath which is firmly affixed to said central metal core; and         an outer sheath which is loosely affixed to said inner sheath;

said power cable optionally comprising metal shielding in said outer sheath, and/or between said inner and outer sheaths.

This is followed by:

b) preparing said waterjet system comprising a plurality of round jet nozzles to consist of a selection from the group consisting of:

an original two round jet nozzles diametrically, or substantially diametrically opposed to one another; and         an original three round jet nozzles placed at 120 degrees to one another;

with sufficient space therebetween to allow said power cable to be passed therebetween; and     c) causing said power cable to slide between said two original round jet nozzles and/or said two original round jet nozzles to move over said power cable, while water is caused to be jetted from both said original round jet nozzles to the end that grooves are created from the surface of the outer sheath all the way to the central metal core.

Once the outer sheathing is loosened, the method continues with:

d) removing said outer sheath and optionally present metal shielding.

The next step involves:

e) providing another waterjet system, or reconfiguring said waterjet system comprising a plurality of round jet nozzles, that presents additional round jet nozzles positioned other than where said original two round jet nozzles were/are, all of said additional non-original round jet nozzles being aimed so as to provide water-jetted onto said power cable inner sheath at locations offset from the locations at which the original two round jets were/are positioned;

f) causing said power cable from which has been removed said outer sheath and optionally present metal sheathing to slide between said additional round jet nozzles, and/or causing said additional round jet nozzles to move over said power cable inner sheath, while water is caused to be jetted therefrom, to the end that additional grooves are created from the surface of the inner sheath all the way to the central metal core so that a plurality of inner sheath strips are present.

The method then continues with:

g) applying said different or modified waterjet system comprising a plurality of fan jet nozzles to provide fan shaped waterjets at an oblique angle to said inner sheath at the location where said inner sheath meets said central metal core, there being sufficient spacing between said plurality of fan shaped waterjet nozzles for said power cable inner sheath and central metal core to fit therebetween; and     h) causing said power cable, from which has been removed said outer sheathing and into which inner sheath a plurality of grooves have been formed, to slide between said fan shaped jet nozzles and/or causing said fan shaped nozzles to move under said power cable inner sheathing, while water is caused to be jetted therefrom, each fan shaped waterjet being oriented to primarily address one said strip in said inner sheath.

The end result of said step h) being that said strips formed in said inner sheath are caused to be removed from the central metal core, leaving said central metal core substantially reclaimed, substantially free of outer and inner sheathing material.

It is noted that power cable motion can be effected by conveyor belt motion, or by a gripping of one end of a power cable and applying a force to the power cable that pulls it along, as when the cable is placed in a trough. Drive wheels that contact a cable can also be utilized.

It is noted that said method can involve the waterjet system used in steps e) is the same, or a different system as used in step b).

It is further noted that said method can involve that the waterjet system used in step g) is the same system, or a different system, as used in steps b) and e).

It is also noted that the metal involved in the shielding and/or core can be selected from the group consisting of:

copper; and aluminum;

although said selections are not limiting. Any metal found in a power-type cable as described herein can be reclaimed by practicing the methodology of the Present Invention.

Further, said method can involve that the step h) removal of strips formed in said inner sheath are caused to be removed from the central metal core further comprises providing and applying powered take-up reels that access and roll up the strips of inner sheath as they are loosened from said metal core.

Experiments actually performed by the Inventor herein provided that waterjetted from said round jet nozzles was at:
- 40,000 psi, and in which relative motion between said water jets and said power cable is 100 inches/minute, or
- 55,000 psi, and in which relative motion between said water jets and said power cable is 200 inches/minute.

It is noted that a system for practicing the identified methodology can involve two conveyor belts/troughs in sequence, said two conveyor belts or cable trough supports being separated from one another such that a gap exists therebetween which is of a length sufficient to allow application of the indicated waterjets to a power cable passing thereover, but short enough so that the power cable will not fall therethrough.

An additional recitation of a present invention method of reclaiming metal from power cables comprising the steps of:
  a) providing a system with a sequence comprising a selection from the group consisting of:
    at least a first conveyor belt having a supporting surface and having an entry and an exit end, said system including means for causing a power cable placed upon the supporting surfaces thereof to move; and
    at least a first cable trough support having a supporting surface and having an entry and an exit end, said system comprising a power cable gripper that enables exerting motion causing force to a cable via pulling, and/or driving said cable by way of force applied thereto by at least one driver wheel, and/or pushing said cable over said at least a first conveyor belt or cable trough support;
  such that in use said selection can be caused to move a power cable placed on the supporting surface thereof to move beyond the exit end thereof.
The method continues with:
  providing a power cable comprised of:
    a central metal core;
    an inner sheath which is firmly affixed to said central metal core; and
    an outer sheath which is loosely affixed to said inner sheath;
    said power cable optionally comprising metal shielding in said outer sheath, and/or between said inner and outer sheaths.
The method continues with:
  providing at least one waterjet nozzle positioned after said exit end of said supporting surface, such that water can be made to eject therefrom in the region after said exit end of said supporting surface;
  b) placing said power cable on said supporting surface, such that a leading portion thereof extends beyond said exit end of said supporting surface;
  c) causing said at least one Jet nozzle to eject waterjet that impinges on said portion of said power cable beyond the exit end of said supporting surface, to the end that inner and outer sheathing is simultaneously removed from the central metal core;
  d) causing said power cable to move so that the leading end thereof projects further beyond the exit end of said supporting surface while continuing to cause said at least one waterjet nozzle to eject waterjets that impinge on said portion of said power cable, to the end that inner and outer sheathing is removed from the central metal core; and
  e) continuing step d) until a majority of said power cable has had the inner and outer sheathing removed therefrom.

Another recitation of a present invention method of reclaiming metal from power cables comprising the steps of:
  a) providing a system with a sequence comprising a selection from the group consisting of:
    at least a first conveyor belt having a supporting surface and having an entry and an exit end, said system including means for causing a power cable placed upon the supporting surfaces thereof to move;
    at least a first cable trough support having a supporting surface and having an entry and an exit end, said system comprising a power cable gripper that enables exerting motion causing force to a cable via pulling, and/or driving said cable by way of force applied thereto by at least one driver wheel, and/or pushing said cable over said at least a first conveyor belt or cable trough support;
  such that in use said selection can be caused to move a power cable placed on said supporting surface to move beyond the exit end thereof.
The method continues with:
  providing a power cable comprised of:
    a central metal core;
    an inner sheath which is firmly affixed to said central metal core; and
    an outer sheath which is loosely affixed to said inner sheath;
    said power cable optionally comprising metal shielding in said outer sheath, and/or between said inner and outer sheaths.
The method continues with:
  providing at least one waterjet nozzle positioned after said exit end of said supporting surface, such that water can be made to eject therefrom in the region after said exit end of said supporting surface;
  b) placing said power cable on said supporting surface, such that a leading portion thereof extends beyond the exit end of said supporting surface;
  c) causing said at least one jet nozzle to eject water that impinges on said portion of said power cable beyond the exit end of the supporting surface, to the end that said outer sheathing is removed;
  d) causing said power cable to move so that the leading end thereof projects further beyond said supporting surface while continuing to cause said at least one waterjet nozzle to eject waterjets that impinge on said portion of said power cable, to the end that outer sheathing is removed; and
  e) continuing step d) until a majority of said power cable has had the outer sheathing removed therefrom.
The method continues with:
  f) applying a different or modified system comprising a plurality of round jet nozzles and causing said at least two round waterjet nozzles to eject waterjets that impinge on said portion of said power cable that is beyond the exit end of said supporting surface, to the end that inner sheathing is caused to have grooves scored therethrough to the central metal core;
  g) applying a different or modified waterjet system comprising a plurality of fan jet nozzles to provide fan shaped waterjets at an oblique angle to said inner sheath at the location where said inner sheath meets said central metal core, there being sufficient spacing between said plurality of fan shaped waterjet nozzles for said power cable inner sheath and central metal core to fit therebetween;

h) causing said power cable, from which has been removed said outer sheathing and into which inner sheath a plurality of grooves have been formed, to slide between said fan shaped jet nozzles and/or causing said fan shaped nozzles to move under said power cable inner sheathing, while water is caused to be jetted therefrom, each fan shaped waterjet being oriented to primarily address one said strip in said inner sheath.

The result is that said strips formed in said inner sheath are caused to be removed from the central metal core, leaving said central metal core substantially reclaimed, substantially free of outer and inner sheathing material.

Another present invention method of reclaiming metal from power cables comprising the steps of:

a) providing a system with a sequence comprising a selection from the group consisting of:

at least a first conveyor belt having a supporting surface and having an entry and an exit end, said system including means for causing a power cable placed upon the supporting surfaces thereof to move;

at least a first cable trough support having a supporting surface and having an entry and an exit end, said system comprising a power cable gripper that enables exerting motion causing force to a cable via pulling, and/or driving said cable by way of force applied thereto by at least one driver wheel, and/or pushing said cable over said at least a first conveyor belt or cable trough support;

such that in use said selection can be caused to move a power cable placed on said supporting surface to move beyond the exit end thereof.

The method continues with:

providing a power cable comprised of:
  a central metal core;
  an inner sheath which is firmly affixed to said central metal core; and
  an outer sheath which is loosely affixed to said inner sheath;
  said power cable optionally comprising metal shielding in said outer sheath, and/or between said inner and outer sheaths; and providing at least two waterjet nozzles positioned after said exit end of said supporting surface, such that water can be made to eject therefrom in the region after said exit end of said supporting surface;

The method then involves:

b) placing said power cable on said supporting surface, such that a leading portion thereof extends beyond the exit end of said supporting surface;

c) causing said at least two jet nozzles to eject water that impinges on said portion of said power cable beyond the exit end of the supporting surface, to the end that grooves are scored into said inner and outer sheathing to the central metal core, thereby creating strips of sheathing;

d) causing said power cable to move so that the leading end thereof projects further beyond said supporting surface while continuing to cause said at least two waterjet nozzles to eject waterjets that impinge on said portion of said power cable beyond the exit end of said supporting surface, to the end that inner and outer sheathing is scored to the central metal core;

e) removing said outer sheathing.

The method then continues with;

f) applying a different or modified waterjet system comprising a plurality of fan jet nozzles to provide fan shaped waterjets at an oblique angle to said inner sheath at the location where said inner sheath meets said central metal core, there being sufficient spacing between said plurality of fan shaped waterjet nozzles for said power cable inner sheath and central metal core to fit therebetween;

h) causing said power cable, from which has been removed said outer sheathing and into which inner sheath a plurality of grooves have been formed, to slide between said fan shaped jet nozzles and/or causing said fan shaped nozzles to move under said power cable inner sheathing, while water is caused to be jetted therefrom, each fan shaped waterjet being oriented to primarily address one said strip in said inner sheath.

The result being that said strips formed in said inner sheath are caused to be removed from the central metal core, leaving said central metal core substantially reclaimed, substantially free of outer and inner sheathing material.

To summarize, metal in power cables can be reclaimed by removing sheathing therefrom by waterjetting procedures. This can be accomplished by simply subjecting all sheathing, in one operation, to waterjets that simultaneously remove loosely affixed outer sheathing, and inner sheathing, which is more securely affixed to an inner metal core. This approach, however, makes recovery of metal in outer sheathing difficult.

A modified approach therefore can be practiced in which at least two grooves are scored through both outer and inner sheathing to the metal core, followed by removal of the loosely affixed outer sheathing. Metal in outer sheathing can then be separated out. This approach, however, leaves the more firmly affixed inner sheathing remaining to be removed from a metal core. This can be done by simply waterjetting the inner sheathing away, or by causing a number of grooves to be scored through it to the metal core, (either along with outer sheathing or after said outer sheathing has been removed), such that a number of strips of inner sheathing are caused to present along the length of the metal core, followed but applying fan jets, (one per strip), at an oblique angle, at the interface where the inner sheathing meets the metal core. The benefit of the later approach, even though it is a bit more complicated to practice, is that the inner sheathing is also recoverable as strips thereof, and reclaiming said sheathing material is far more easily accomplished than is the case where it is simply waterjetted away. In the cases where outer, or both inner and outer sheathing materials are simply waterjetted away, a slurry of sorts results, and it is difficult to remove sheathing components therefrom. Hence, while easier to practice, said methods that simply waterjet outer, and inner sheathing away from a metal core create a situation wherein additional efforts and costs are involved to reclaim said sheathing materials from a slurry containing them. Savings in the waterjetting stage that simply waterjets away inner, and perhaps outer sheathing, can be eclipsed in costs that are then required to prevent detrimental discharged into the environment. From a broad viewpoint, methodology disclosed herein which removes outer and inner sheathing from power cable metal cores in a way that makes their reclamation easier, are therefore considered preferred.

It is to be understood that in any method, where one waterjet is recited, others can be sequentially present thereafter. This is in addition to multiple waterjets being present surrounding a power cable, and is relevant to the gap region between at least two conveyors or supports, and in a region after at least one thereof. Further, in any embodiment of the Present Invention disclosed herein, where a stationary Nozzle is recited, unless specifically stated otherwise or would be physically impossible, it is to be understood that a Spin Nozzle system can be substituted therefore, and vice-versa. That is, where a Spin Nozzle system is recited, a Stationary Nozzle can be substituted therefore.

The present invention will be better understood by reference to the Detailed Description Section of this Specification, in conjunction with the Drawings.

DETAILED DESCRIPTION

Figure 1:
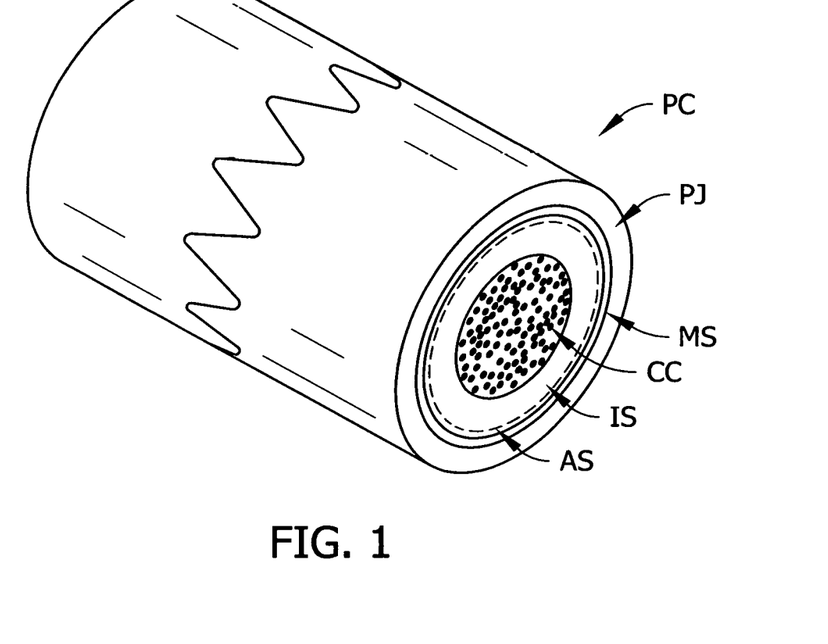
FIGS. 1 and 2 show slightly perspective side elevational, and cross-sectional views of a typical power cable.
Figure 2:
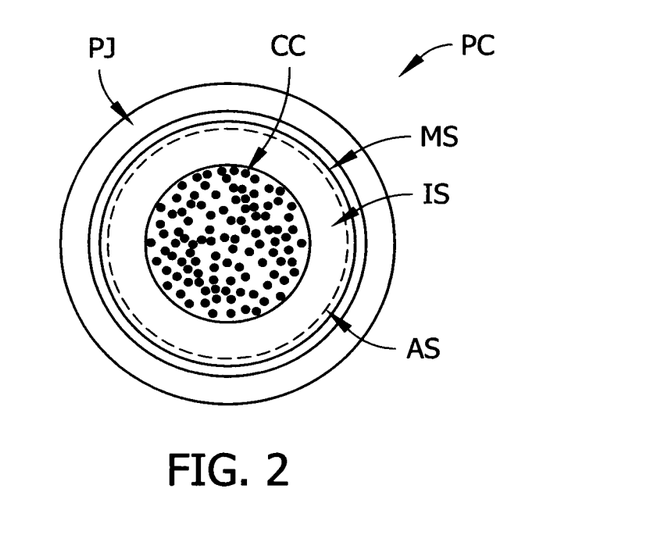

FIGS. 1 and 2 show slightly perspective side elevational, and cross-sectional views of a typical Power Cable (PC). FIG. 2 provides labels for an Outer Sheath (PJ), a Metal Shield (MS) between the Outer (PJ) and Inner (IS) Sheaths, said Inner Sheath (IS), and a Metal Core (CC). It is noted at this point that the Inner Sheath (IS) is typically a thin plastic covering and a thicker insulator which is very firmly affixed to the Metal Core (CC). This can include an elastomer or rubberized material. Note that an additional sheath (AS) can exist between the metal sheath (MS) and the inner sheath (IS).

Figure 3:
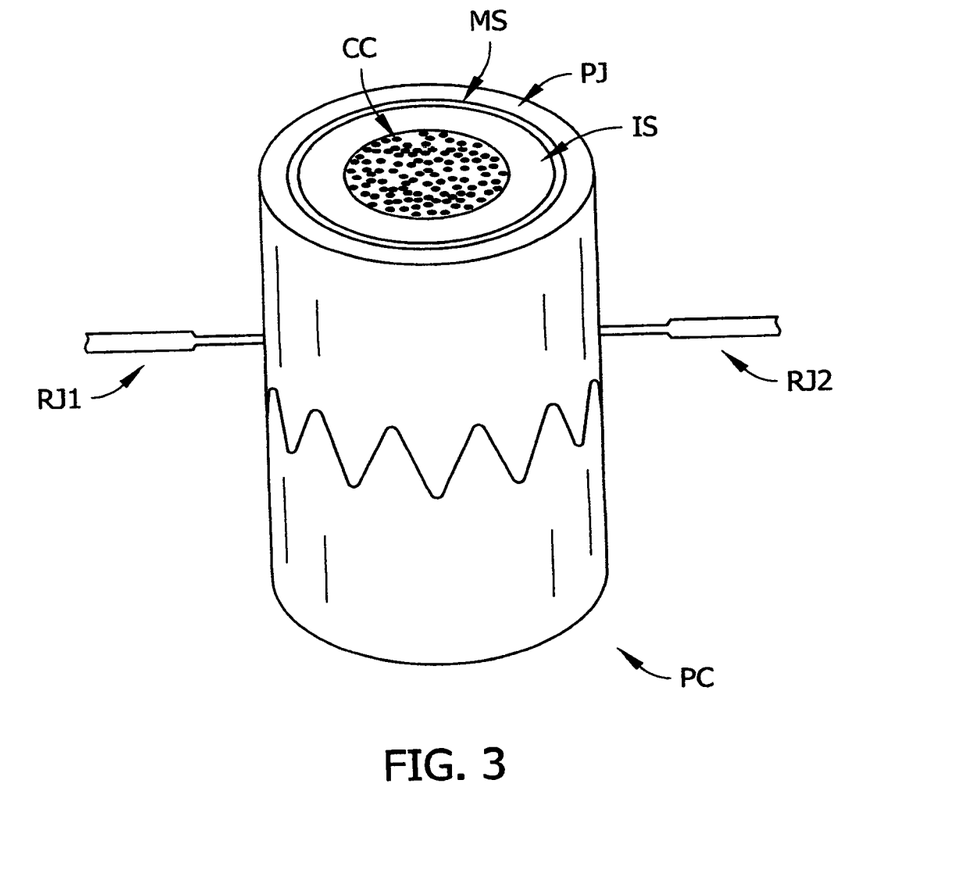
FIG. 3 shows two round jet nozzles (RJ1) (RJ2) diametrically, or substantially diametrically opposed to one another with sufficient space therebetween to allow said power cable to be passed therebetween.

FIG. 3 shows two round jet nozzles (RJ1) (RJ2) diametrically, or substantially diametrically opposed to one another with sufficient space therebetween to allow said power cable (PC) to be passed therebetween.

Figure 4:
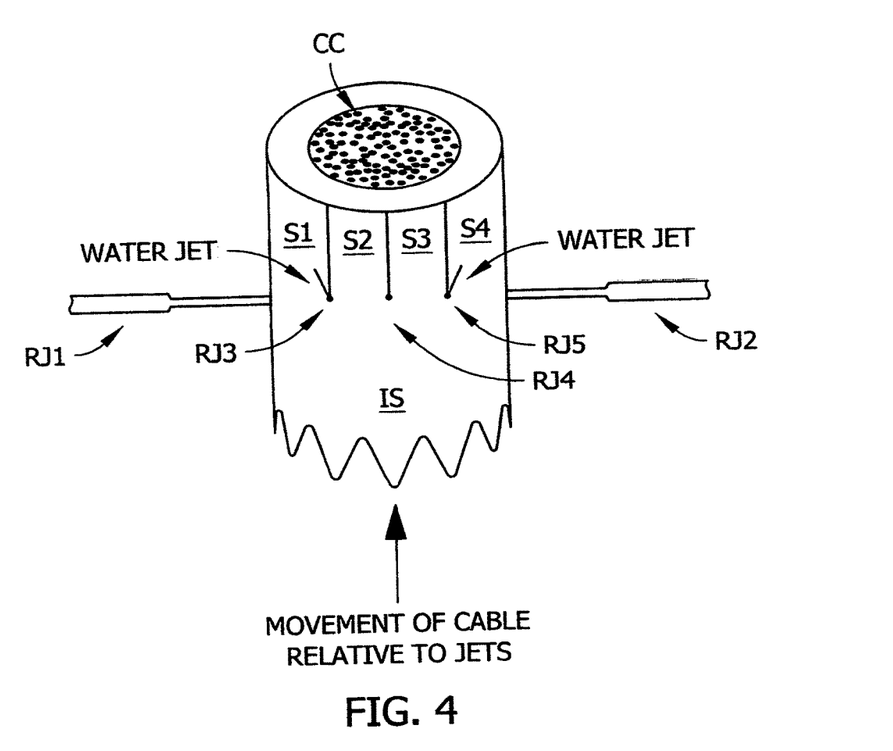
FIG. 4 shows how a plurality of round jet nozzles provide water jetted onto a power cable inner sheath, at locations offset from the locations at which the original two round jets were/are positioned in FIG. 3 forms strips of inner sheath.

Note that between what is shown in FIGS. 3 and 4 the Outer Sheath (PJ) and the Inner Sheath (IS) is removed. In some cases simply cutting through said (PJ) and (MS) with waterjetted from Round Jets (RJ1) and (RJ2) is sufficient to allow the two halves of (PJ) and (IS) to fall away, as they are not very firmly attached to the Inner Sheath (IS). When said (PJ) and (MS), (or other coverings), are removed they might be taken up by reels, or just accumulated in a bin. This is particularly true where the (PJ) or (MS) etc. is not removed in a continuous manner, but appears as a multiplicity of independent pieces.

FIG. 4 shows how a plurality of Round Jet Nozzles (RJ3), (RJ4), (RJ5), (also shown for reference are original two Round Jets (RJ1) and (RJ2)), provide waterjetted onto a Power Cable (PC) inner sheath (IS), at locations offset from the locations at which the original two Round Jets (RJ1) (RJ2) were/are positioned in FIG. 3. Note the formation of Strips (S1) (S2) (S3) and (S4) in Inner Sheath (IS).

Figure 5:
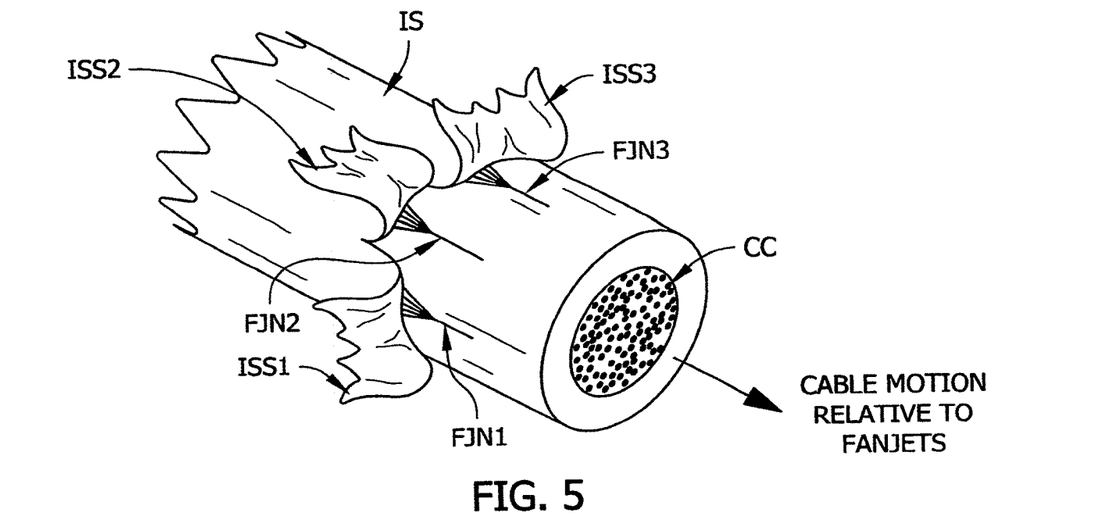
FIG. 5 gives insight as to how fan jet nozzles remove the strips of inner sheath as shown in FIG. 4.

FIG. 5 gives insight as to how Fan Jet Nozzles (FJN1), (FJN2), (FJN3) remove the Strips (ISS1) (ISS2) (ISS3), of inner sheath, which Strips (ISS1) (ISS2) (ISS3) were formed as shown in FIG. 4, using Round Jet Nozzles (RJ3), (RJ4), (RJ5) in addition to the effects of the Round Jet Nozzles (RJ1) and (RJ2). Again, as Strips (ISS1) (ISS2) (ISS3) etc. are removed they can be taken up by reels.

For completeness, note that Round Jet Nozzle provides a small diameter jet of water well suited for making small width cuts through materials encountered and are therefore well suited for performing the tasks shown in FIGS. 3 and 4. Fan Jet Nozzles, on the other hand, provide a jet of water that spreads out to cover more area, and is therefore well suited to addressing removal of the Strips of material as shown in FIGS. 4 and 5.

Figure 6:
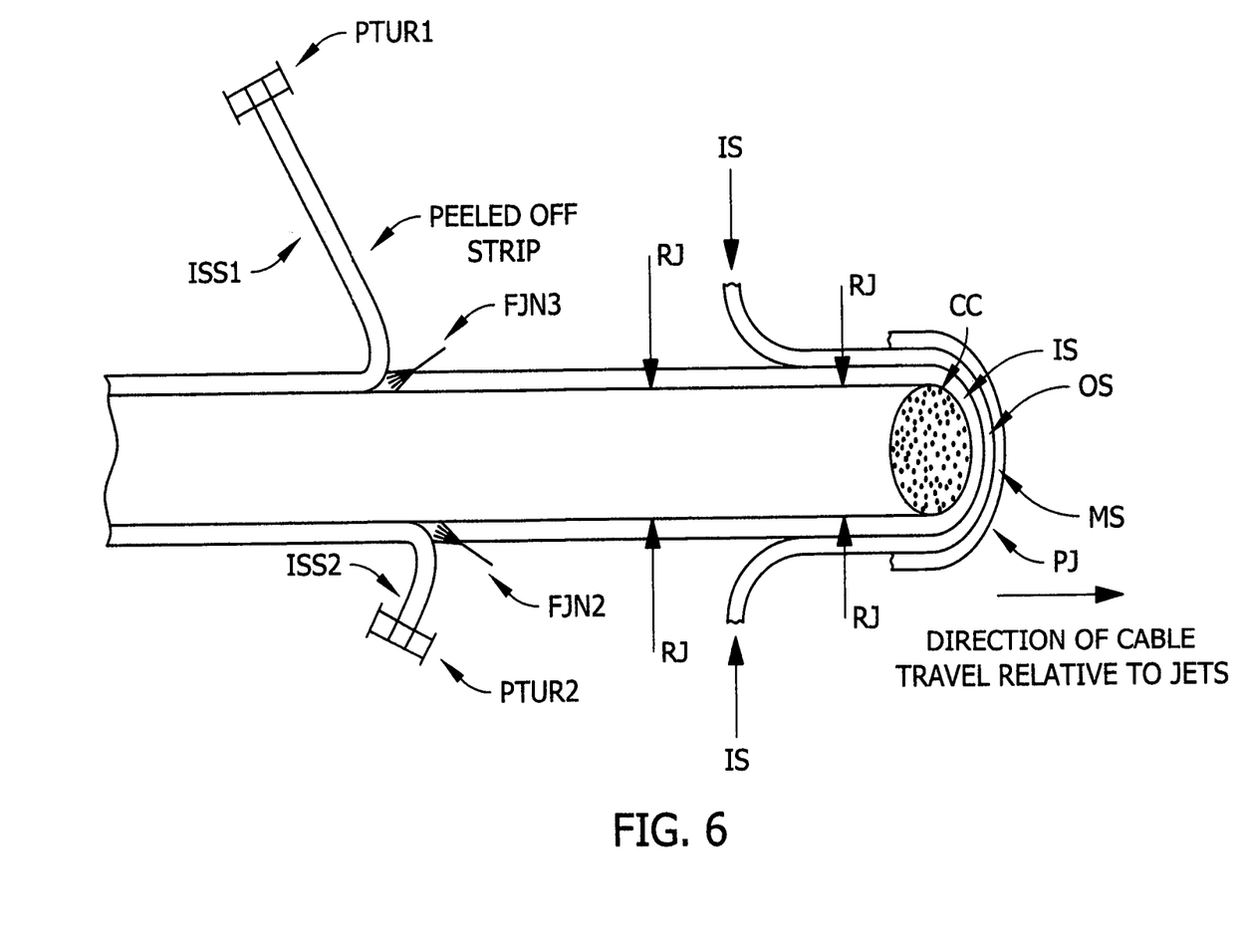
FIG. 6 shows strips of inner sheath removed from said metal core.

FIG. 6 shows removal of strips formed in said inner sheath are caused to be removed from the central metal core further comprises providing and applying powered take-up reels (PTUR1) (PTUR2) that access and roll up the strips (ISS1) (ISS2) of inner sheath as they are loosened from said metal core. It is also mentioned that electric means can be applied to aid in the separation of metal and non-metal cable components. This can be especially useful where removed metal and non-metal components are present as small fragments, rather than long strips. Such electric aided metal and non-metal component removal is typically termed "eddy-current" recovery. Other techniques may also be used for component separation, such as optical, (eg. color detection), and mechanical based approaches.

Figure 7A:
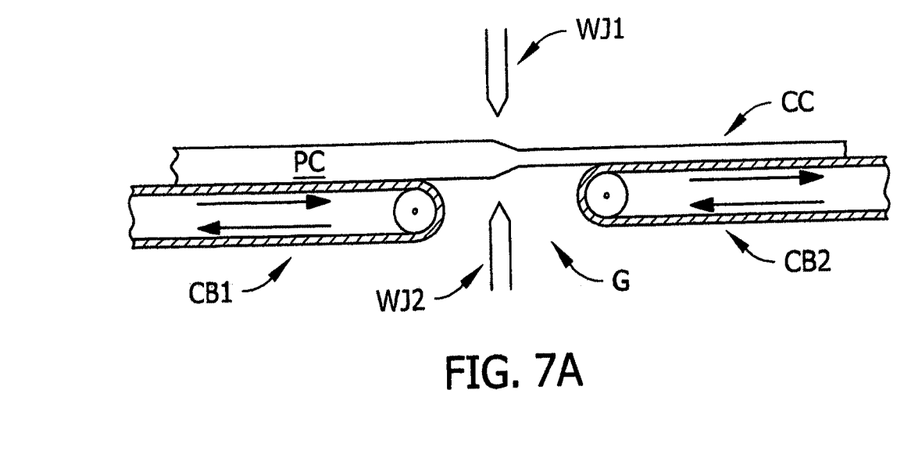
FIG. 7A shows a configuration of two conveyor belt cable supports, oriented sequentially with respect to one another suitable for use in the present invention, showing a gap therebetween and a power cable moving along atop thereof.

FIG. 7A is included to show a configuration of two Conveyor Belts (CB1) (CB2) oriented suitably sequentially with respect to one another for use in practicing the present invention. Note a gap (G) is present between the two Conveyor Belts (CB1) (CB2), and a Power Cable (PC) is shown moving along atop thereof. In the region of the Gap (G) are generically shown demonstrative Waterjet Nozzles (WJN1) and (WJN2), which can be of any suitable design, (eg. round, fan, spinning systems etc.), depending on the point in the present invention methodology they are being applied. Note the second Conveyor Belt (CB2) is shown positioned a bit vertically higher than is (CB1). This is to account for the reduced diameter of the Power Cable (PC) Metal Core (CC), after the sheathing has been removed therefrom. It is also to be understood that the Present Invention is not limited to providing only a single Gap. Multiple Gap (G) areas can be present in a Present Invention system, complete with additional Waterjetting Nozzles, (stationary or spinning type etc.), positioned with respect thereto so as to provide additional removal of non-metal from metal in power-type cables, and the like.

Figure 7B:
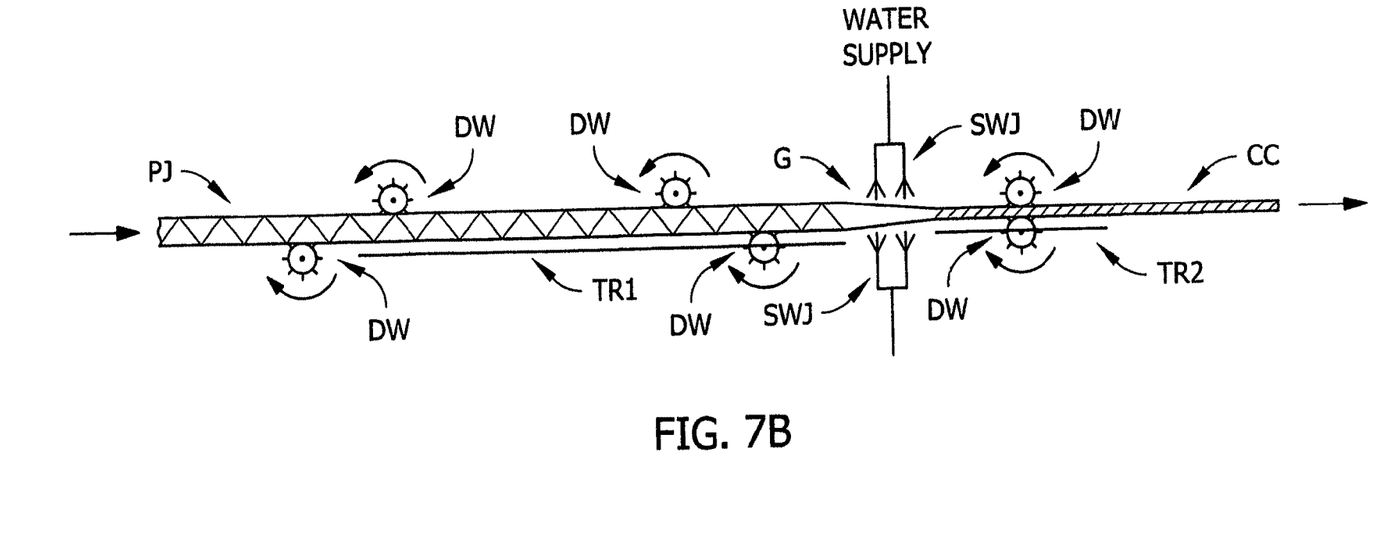
FIG. 7B shows a configuration of two conveyor troughs cable supports, oriented sequentially with respect to one another suitable for use in the present invention, showing a gap therebetween and a power cable moving along atop thereof.

FIG. 7B shows a configuration similar to that in FIG. 7A, except that there are two Trough (TR1) TR2) cable supports present, oriented sequentially with respect to one another and suitable for use in the present invention. Note a gap (G), exists between the Troughs, and a power cable moves along atop thereof under the influence of Drive Wheels (DW) are present, and serve to contact the cable present, and cause it's motion to the right, as shown. Spinning Waterjet systems (SWJ's) are shown in the Gap (G) region. As mentioned elsewhere, the Drawings are not meant to imply a limitation of the Present Invention system to a single Gap (G) region. The Drawings are demonstrative only and not limiting. Many Gap (G) regions could be present, each accompanied by Stationary and/or Spinning Nozzle systems.

A typical distinction between Conveyor Belts and Troughs is that Conveyor Belts are usually flat surfaced, whereas Troughs are earmarked by, as viewed end-on in elevation, higher sides with a lower mid-section therebetween so that contents placed thereinto are not prone to be easily removed therefrom as they are caused to proceed along a longitudinal dimension thereof. However, a Conveyor Belt with a Trough-like shape is within the scope of the Present Invention, as is a very shallow Trough, (ie. the sides are only slightly higher than the mid-section as viewed end-on in elevation.

(Note, in any embodiment, either non-spinning (WJ1) (WJ2), or Spinning Waterjets (SWJ) can be applied).

Figure 8A:
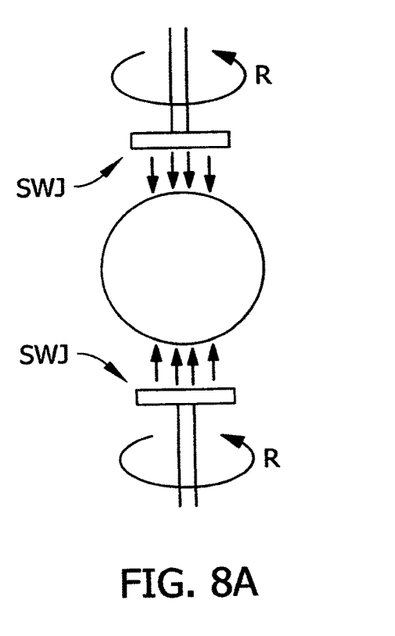
FIGS. 8A and 8A' are included to show, respectively, a two Spinning nozzle waterjet system in a 180 diametrically opposing configuration, and a three Spinning nozzle waterjet system with the three nozzles oriented in a 120 degree rotated configuration.
Figure 8B:
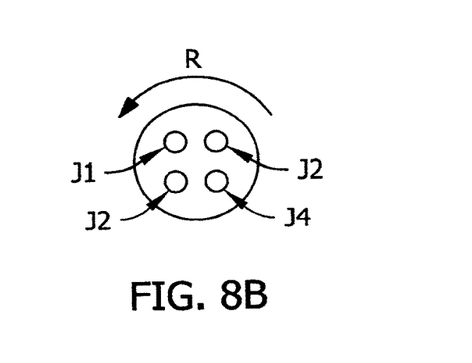
FIG. 8b is included to show what is meant by a spin-type waterjet nozzle.

FIGS. 8A and 8A' are show, respectively, a two Spinning nozzle waterjet system in a 180 diametrically opposing configuration, and a three Spinning nozzle waterjet system with the three nozzles oriented in a 120 degree rotated configuration. FIG. 8B shows an elevational face-on view of the Nozzle water output system. FIGS. 8B, and 8A and 8A' are included to show what is meant by a Rotating or Spinning Nozzle System, and different approaches to their deployment. Note an indication of rotation (R) is present about a locus that is essentially central between the Nozzles (J1) (J2) (J3) (J4) thereof. An example of such a commercially available Spin Nozzle system is called that the 4-Port "Barracuda" Nozzle, made by StoneAge®.

Figure 9:
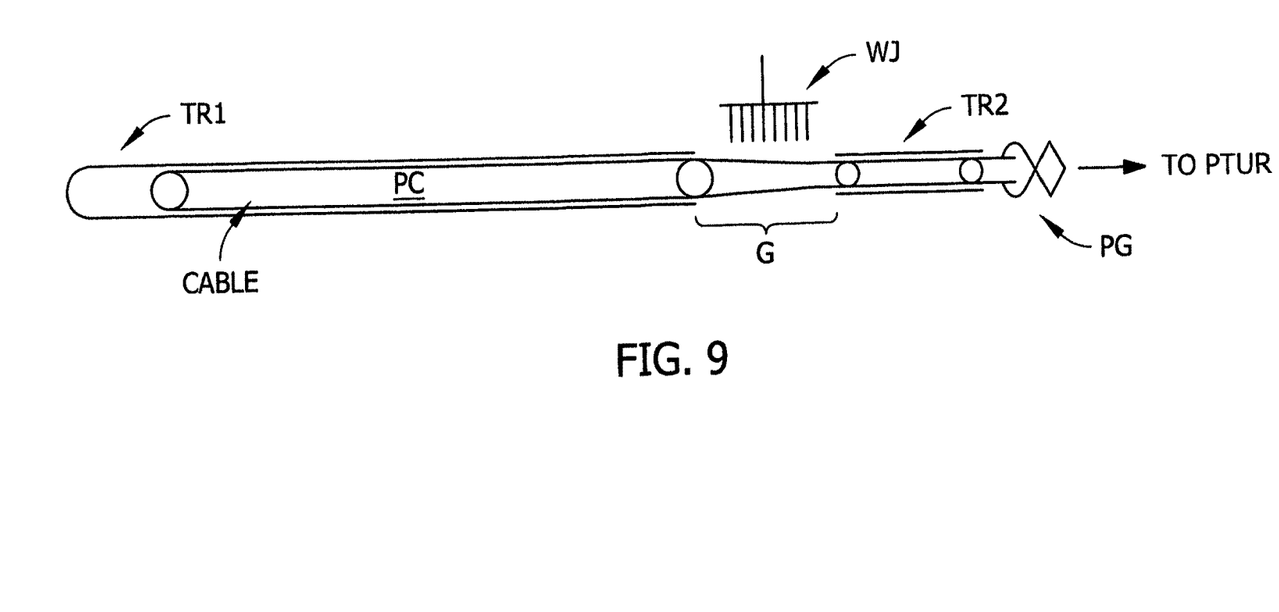
FIG. 9 shows a top view of a system comprising a cable trough support system, in combination with a pincer cable gripping element that allows applying cable moving force to the power cable.

FIG. 9 shows a top view of a system comprising a cable support system (TR), (shown as a trough), in combination with a pincer cable gripping element (PG) that allows applying cable moving force to the power cable (PC). Note that although only a first trough (TR1) is necessary, a second Trough (TR2) is generally beneficial to operation of the system. (PTUR) identifies a processed cable receiving powered take-up reel.

In the foregoing it is noted that typical, non-limiting, metals used in Power Cable (PC) Shields (MS) and Cores (CC) are copper and/or aluminum, though this is not a limitation.

Figure 10A:
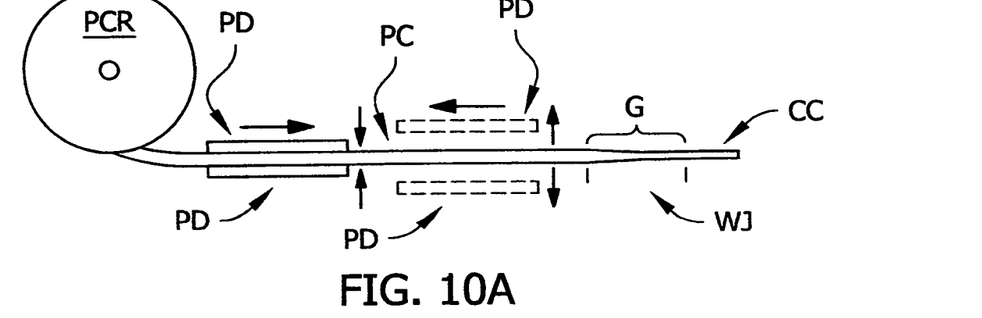
FIGS. 10A, 10B, 10C and 10C' show various systems for pushing a power cable received from a power cable reel, into position for being waterjetted.
Figure 10B:
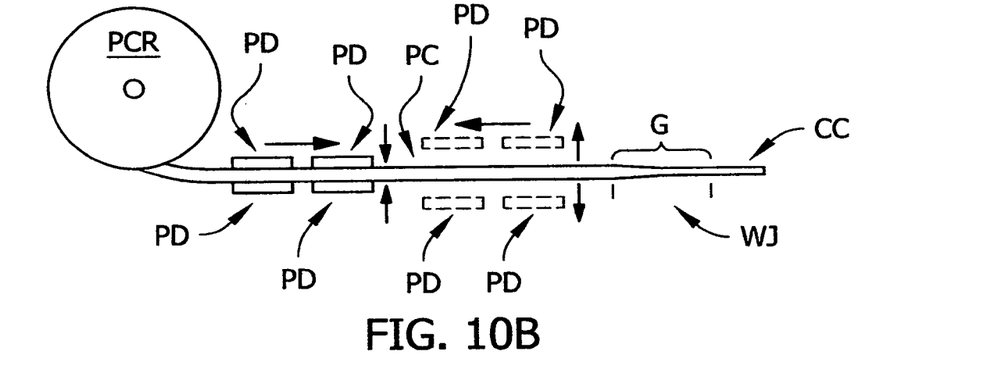
Figure 10C:
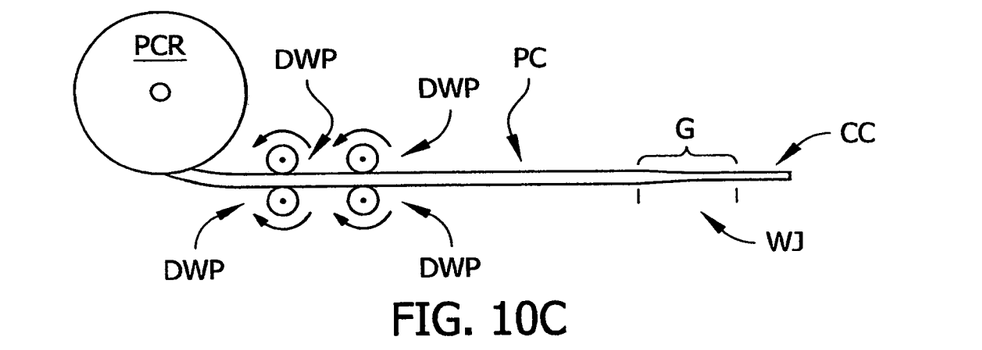

FIGS. 10A, 10B, 10C and 10C' show various systems for pushing a Power Cable (OC) received from a Power Cable Reel (PCR), into position for being waterjetted, (eg a Gap (G) region). Prior hereto in this Specification systems have focused on providing means for pulling or driving a Power Cable (PC) toward a location at which Waterjetting (WJ) is applied, (see FIGS. 7A, 7B and 7C). It is also possible, however, to Push a Power Cable (PC) which is, for instance, received from a Power Cable Reel into position. Note the presence of Push Drivers (PD) in FIGS. 10A and 10B. In use the Push Drivers can be positioned in contact with a Power Cable (PC), as shown in solid lines to the left in said Drawings. Then the Present Invention provides that said Push Drivers (PD) are caused to move to the right, carrying the Power Cable along with them. Next the Push Drivers (PD) are caused to be taken out of contact with the Power Cable, as shown in dashed lines to the right of the Push Drivers (PD) shown in solid lines. While removed from contact with the Power Cable (PC) the Push Drivers (PD) are moved to the left and again caused to contact the Power Cable (PC), which is then again caused to mover to the right. This procedure can be repeated as long as there is Power Cable (PC) remaining to be processed. Another approach is to have a pair of push drivers positioned sequentially that operate alternately, so that at least one push driver is grasping the cable at all times.

FIG. 10C shows a system somewhat fashioned after that in FIG. 7B, in which there are Push Drive Wheels (DWP) positioned to receive Power Cable (PC) and push it along by friction contact therewith while rotating. Note that the Push Drive Wheels (DWP) are shown to be of a somewhat different design than those in FIG. 7B which have projections extending from the surface thereof. This is not to be considered limiting, and both FIGS. 7B and 10C can use either (DW) or (DWP) design, or some other design and remain within the scope of the Present Invention. FIG. 10C' indicates that Conveyor Belts (CB) can be added to the FIG. 10C system, with Push Drive Wheels (DWP) serving as guides for the Conveyor Belts (CB).

Finally, it is to be understood that power cables nearly always consist of three major components: protective jacket, insulation and conductors, but can vary due to custom designs and specifications and applications. Exemplary options are: the number, placement and composition of sheaths and their functions, (eg. jacket, shield, insulation, degree of adhesion between components and designated use). Power cables for burial, or those with exposed conductors can include protection, (eg. wires helically wound around the cable, or spiral etc. wound tape can, for instance, be present). The Drawings herein show a common configuration, but are not to be considered as excluding functionally similar, but different power cable designs. It is emphasized that there are many variations of power cable construction, none of which is to be considered excluded from the scope of the Claims, as regards application methodology of the present Waterjetting invention. Further, some Drawings show Conveyor Belts and some show Troughs as supports for Cables during Present Invention processing. It is to be considered that where Conveyor Belts are shown that, unless specifically indicated otherwise or the resulting system would not operate, Troughs can be substituted, and vice-versa. Where Troughs are shown in a Drawing, unless specifically indicated otherwise or the resulting system would not operate, Conveyor Belts can be substituted.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the claims.

I claim:

1. A method of reclaiming metal from power cables comprising the steps of:
   a) providing a sequence of at least first and second cable trough supports, each having a supporting surface and each having an entry and an exit end, said exit end of the first of said at least two cable supports being separated from the entry end of the second, so that a gap region exists therebetween, said system of at least first and second cable trough supports further comprising a power cable gripper that enables exerting motion causing force to a cable via pulling, and/or driving said cable by way of force applied thereto by at least one driver wheel, and/or pushing said cable over said at least first and second cable trough supports;

such that in use said power cable can be caused to move over said gap region;

providing a power cable comprised of:
        a central metal core;
        an inner sheath which is firmly affixed to said central metal core; and
        an outer sheath which is loosely affixed to said inner sheath;
        said power cable optionally comprising metal shielding in said outer sheath, and/or between said inner and outer sheaths; and
    providing at least one waterjet nozzle positioned in said gap between said exit and entry ends of said sequentially oriented at least first and second cable trough supports so that in use said at least one waterjet nozzle can be made to eject at least one waterjet into said gap region;

said method continuing with:

b) placing said power cable on said supporting surface of said first cable trough support, such that a portion thereof is atop said first cable trough support, and a leading portion thereof extends into said gap region, and optionally extends onto the supporting surface of the second cable trough support;

c) causing said at least one waterjet nozzle to eject at least one waterjet that impinges on said portion of said power cable that is in the gap region;

d) causing said power cable to move so that the leading end thereof projects onto, or further onto the supporting surface of the second cable trough support while causing said at least one waterjet nozzle to eject water that impinges on said portion of said power cable that is in the gap region, to the end that inner and outer sheathing is removed from the central metal core; and e) continuing step d) until a majority of said power cable has had the inner and outer sheathing removed therefrom.

2. A method as in claim 1, wherein at least one said waterjet nozzle is of a spinning type and constructed so as to eject at least two waterjets therefrom, said waterjets being caused to rotate during use, about locus located essentially central between present nozzles.

3. A method as in claim 1, in which the waterjet is ejected at 20,000 PSI, while said power cable and waterjet nozzles are caused to move at about three feet/minute with respect to one another.

4. A method of reclaiming metal from power cables comprising the steps of:

a) providing a sequence of at least first and second cable trough supports, each having a supporting surface and each having an entry and an exit end, said exit end of the first of said at said least two cable trough supports being separated from the entry end of the second, so that a gap region exists therebetween; and providing a power cable comprised of:
    a central metal core;
    an inner sheath which is firmly affixed to said central metal core; and
    an outer sheath which is loosely affixed to said inner sheath;
    said power cable optionally comprising metal shielding in said outer sheath, and/or between said inner and outer sheaths; and providing at least two round waterjet nozzles positioned in said gap between said exit and entry ends of said sequentially oriented at least first and second cable trough supports so that in use they can be made to eject waterjets that enter into said gap region;

b) placing said power cable on said at least first cable trough support such that a portion thereof is atop said first cable trough support, and a leading portion thereof extends into said gap region and optionally extends onto the supporting surface of the second cable trough support;

c) causing said round waterjet nozzles to eject waterjets that impinge on said portion of said power cable that is in the gap region, to the end that inner and outer sheathing are caused to have grooves scored therethrough to the central metal core;

d) causing said round waterjet nozzles to move over said power cable and/or said power cable to move so that the leading end thereof projects onto, or further onto the supporting surface of the second cable trough support while causing said round waterjet nozzles to eject waterjets that impinge on said portion of said power cable that is in the gap region, to the end that inner and outer sheathing have grooves scored thereinto to the central metal core along a desired length of said power cable, thereby forming strips of sheathing along a length of said power cable;

e) removing the outer sheathing which is loosely affixed to said inner sheath and any optional metal shielding in said outer sheath, and/or between said inner and outer sheaths;

f) providing another waterjet system, or reconfiguring said waterjet system comprising at least two round waterjet nozzles, to provide a waterjet system comprising a plurality of fanjet nozzles which can be directed to provide fan shaped waterjets in the gap region, at an oblique angle to said inner sheath at the location where said inner sheath meets said central metal core, there being sufficient spacing between said plurality of fan shaped waterjet nozzles for said power cable inner sheath and central metal core to fit therebetween;

g) causing said power cable, from which has been removed said outer sheathing and into which inner sheath a plurality of grooves have been formed, to slide over said fan shaped jet nozzles and/or causing said fan shaped nozzles to move by said power cable inner sheathing, while water is caused to be jetted therefrom into said gap region, each fan shaped water jet being oriented to primarily address one said strip in said inner sheath;

the result being that said strips formed in said inner sheath are caused to be removed from the central metal core, leaving said central metal core substantially free of outer and inner sheathing material.

5. A method of reclaiming metal from power cables comprising the steps of:

a) providing at least one waterjet system comprising a plurality of round jet nozzles;

providing a power cable comprised of:
    a central metal core;
    an inner sheath which is firmly affixed to said central metal core; and
    an outer sheath which is loosely affixed to said inner sheath;

said power cable optionally comprising metal shielding in said outer sheath, and/or between said inner and outer sheaths;

b) preparing said waterjet system comprising a plurality of round jet nozzles to consist of an original two round jet nozzles diametrically, or substantially diametrically opposed to one another with sufficient space therebetween to allow said power cable to be passed therebetween;

c) causing said power cable to slide between said two original round jet nozzles and/or said two original round jet nozzles to move over said power cable, while water is caused to be jetted from both said original round jet nozzles to the end that grooves are created from the surface of the outer sheath all the way to the central metal core;

d) removing said outer sheath and optionally present metal shielding;

e) providing another waterjet system, or reconfiguring said waterjet system comprising a plurality of round jet nozzles, that presents additional round jet nozzles positioned other than where said original two round jet nozzles were/are, all of said additional non-original round jet nozzles being aimed so as to provide waterjetted onto said power cable inner sheath at locations offset from the locations at which the original two round jets were/are positioned;

f) causing said power cable from which has been removed said outer sheath and optionally present metal sheathing to slide between said additional round jet nozzles, and/or causing said additional round jet nozzles to move over said power cable inner sheath, while water is caused to be jetted therefrom, to the end that additional grooves are created from the surface of the inner sheath all the way to the central metal core so that a plurality of inner sheath strips are present;

g) providing another waterjet system, or reconfiguring said waterjet system comprising a plurality of round jet nozzles, to provide a waterjet system comprising a plurality of fanjet nozzles which can be directed to provide fan shaped waterjets at an oblique angle to said inner sheath at the location where said inner sheath meets said central metal core, there being sufficient spacing between said plurality of fan shaped waterjet nozzles for said power cable inner sheath and central metal core to fit therebetween;

h) causing said power cable, from which has been removed said outer sheathing and into which inner sheath a plurality of grooves have been formed, to slide between said fan shaped jet nozzles and/or causing said fan shaped nozzles to move over said power cable inner sheathing, while water is caused to be jetted therefrom, each fan shaped waterjet being oriented to primarily address one said strip in said inner sheath;

the result being that said strips formed in said inner sheath are caused to be removed from the central metal core, leaving said central metal core substantially free of outer and inner sheathing material.

6. A method as in claim 5, wherein waterjetted from said round jet nozzles is at 40,000 psi, and in which relative motion between said waterjets and said power cable is 100 inches/minute.

7. A method as in claim 5, wherein waterjetted from said round jet nozzles is at 55,000 psi, and in which relative motion between said waterjets and said power cable is 200 inches/minute.

8. A method as in claim 5, in which the waterjet system used in steps e) is the same system as used in step b).

9. A method as in claim 5, in which the waterjet system used in step b) is a different system from that used in step e).

10. A method as in claim 5, in which the waterjet system used in step g) is the same system as used in steps b) and e).

11. A method as in claim 5, in which the waterjet system used in step g) is a different system than used in steps b) and e).

12. A method as in claim 5, in which the step h) removal of strips formed in said inner sheath are caused to be removed from the central metal core further comprises providing and applying powered take-up reels that access and roll up the strips of inner sheath as they are loosened from said metal core.

13. A method as in claim 5 in which an additional sheath exists between the metal sheath and the inner sheath.

14. A method as in claim 5, in which the metal involved as shielding and/or core is selected from the group consisting of:
 copper; and
 aluminum.

15. A method of reclaiming metal from power cables comprising the steps of:

a) providing a system comprising at least a first cable trough support having a supporting surface and having an entry and an exit end, said system comprising a power cable gripper that enables exerting motion causing force to a cable via pulling, and/or driving said cable by way of force applied thereto by at least one driver wheel, and/or pushing said cable over said first cable trough support;

such that in use said system can be caused to move a power cable placed on the first cable trough supporting surface to move beyond the exit end thereof;

providing a power cable comprised of:
 a central metal core;
 an inner sheath which is firmly affixed to said central metal core; and
 an outer sheath which is loosely affixed to said inner sheath;
 said power cable optionally comprising metal shielding in said outer sheath, and/or between said inner and outer sheaths; and providing at least one waterjet nozzle positioned after said exit end of said first cable trough supporting surface, such that water can be made to eject therefrom in the region after said exit end of said supporting surface;

b) placing said power cable on said first cable trough supporting surface, such that a leading portion thereof extends beyond said exit end of said first cable trough supporting surface;

c) causing said at least one jet nozzle to eject at least one waterjet that impinges on said portion of said power cable that extends beyond the exit end of said first cable trough supporting surface, to the end that inner and outer sheathing is simultaneously removed from the central metal core;

d) causing said power cable to move so that the leading end thereof projects further beyond the exit end of said first cable trough supporting surface while continuing to cause said at least one waterjet nozzle to eject at least one waterjet that impinges on said portion of said power cable that extends beyond the exit end of said first cable trough supporting surface, to the end that inner and outer sheathing is removed from the central metal core of said power cable; and e) continuing step d) until a majority of said power cable has had the inner and outer sheathing removed therefrom.

16. A method of reclaiming metal from power cables comprising the steps of:
  a) providing a system comprising at least a first cable trough support having a supporting surface and having an entry and an exit end, said system comprising a power cable gripper that enables exerting motion causing force to a cable via pulling, and/or driving said cable by way of force applied thereto by at least one driver wheel, and/or pushing said cable over said first cable trough support;
  such that in use said power cable is placed on said supporting surface of said first cable trough supporting surface and is caused to move beyond the exit end thereof;
    providing a power cable comprised of:
      a central metal core;
      an inner sheath which is firmly affixed to said central metal core; and
      an outer sheath which is loosely affixed to said inner sheath;
      said power cable optionally comprising metal shielding in said outer sheath, and/or between said inner and outer sheaths; and
    providing at least one waterjet nozzle positioned after said exit end of said supporting surface of said first cable trough, such that at least one waterjet can be made to eject therefrom in the region after said exit end of said supporting surface of said first cable trough support;
  b) placing said power cable on said first cable trough supporting surface, such that a leading portion thereof extends beyond the exit end thereof;
  c) causing said at least one jet nozzle to eject at least one waterjet that impinges on said portion of said power cable extending beyond the exit end of the first cable trough supporting surface;
  d) causing said power cable to move so that the leading end thereof projects further beyond the exit end of said first cable trough supporting surface while continuing to cause said at least one waterjet nozzle to eject at least one waterjet that impinges on said power cable projecting beyond said exit end of said first cable trough support, to the end that outer sheathing is removed;
  e) continuing step d) until a majority of said power cable has had the outer sheathing removed therefrom;
  f) applying a different or modified system comprising a plurality of round jet nozzles and causing said at least two round waterjet nozzles to eject waterjets that impinge on said portion of said power cable that is beyond the exit end of said first cable trough supporting surface, to the end that inner sheathing is caused to have grooves scored therethrough to the central metal core;
  g) providing another waterjet system, or reconfiguring said waterjet system comprising a plurality of round jet nozzles, to provide a waterjet system comprising a plurality of fan shaped waterjets which can be directed to provide fan shaped waterjets at an oblique angle to said inner sheath at the location where said inner sheath meets said central metal core, there being sufficient spacing between said plurality of fan shaped waterjet nozzles for said power cable inner sheath and central metal core to fit therebetween;
    outer sheathing and into which inner sheath a plurality of grooves have been formed, to slide between said fan shaped jet nozzles and/or causing said fan shaped nozzles to move under said power cable inner sheathing, while water is caused to be jetted therefrom, each fan shaped waterjet being oriented to primarily address one said strip in said inner sheath;
  the result being that said strips formed in said inner sheath are caused to be removed from the central metal core, leaving said central metal core substantially substantially free of outer and inner sheathing material.

17. A method of reclaiming metal from power cables comprising the steps of:
  a) providing a system comprising at least a first cable trough support having a supporting surface and having an entry and an exit end, said system comprising a power cable gripper that enables exerting motion causing force to a cable via pulling, and/or driving said cable by way of force applied thereto by at least one driver wheel, and/or pushing said cable over said at least a first cable trough support;
  such that in use said system can be caused to move a power cable placed on said supporting surface to move beyond the exit end thereof;
    providing a power cable comprised of:
      a central metal core;
      an inner sheath which is firmly affixed to said central metal core; and
      an outer sheath which is loosely affixed to said inner sheath;
      said power cable optionally comprising metal shielding in said outer sheath, and/or between said inner and outer sheaths; and
    providing at least two waterjet nozzles positioned after said exit end of said supporting surface, such that water can be made to eject therefrom in the region after said exit end of said first cable trough supporting surface;
  b) placing said power cable on said first cable trough supporting surface, such that a leading portion thereof extends beyond the exit end of said first cable trough supporting surface;
  c) causing said at least water two jet nozzles to eject waterjets that impinge on said portion of said power cable that extends beyond the exit end of said first cable trough supporting surface, to the end that grooves are scored into said inner and outer sheathing to the central metal core, thereby creating strips of sheathing;
  d) causing said at least two waterjet nozzles to move over said power cable and/or said power cable to move so that the leading end thereof projects further beyond the exit end of said first cable trough supporting surface while continuing to cause said at least two waterjet nozzles to eject waterjets that impinge on said portion of said power cable beyond the exit end of said first cable trough supporting surface, to the end that inner and outer sheathing is scored to the central metal core;
  e) removing said outer sheathing;
  f) providing another waterjet system, or reconfiguring said waterjet system comprising a plurality of round jet nozzles to provide a modified waterjet system comprising a plurality of fanjet nozzles which can be directed to provide fan shaped waterjets at an oblique angle to said inner sheath at the location where said inner sheath meets said central metal core, there being sufficient spacing between said plurality of fan shaped waterjet nozzles for said power cable inner sheath and central metal core to fit therebetween;
  g) causing said power cable, from which has been removed said outer sheathing, and into which inner sheath a plurality of strip forming grooves have been formed, to slide between said fan shaped jet nozzles and/or causing said fan shaped nozzles to move with respect to said power cable inner sheathing, while water is caused to be jetted therefrom, each fan shaped waterjet being oriented to primarily address one said strip in said inner sheath;

the result being that said strips formed in said inner sheath are caused to be removed from the central metal core, leaving said central metal core substantially substantially free of outer and inner sheathing material.

18. A method of reclaiming metal from power cables comprising the steps of:
 a) providing:
  at least a first cable trough support having a supporting surface and having an entry and an exit end, said system comprising a power cable gripper that enables exerting motion causing force to a cable via pulling, and/or driving said cable by way of force applied thereto by at least one driver wheel, and/or pushing said cable over said at least a first cable trough support; and
  a power cable comprised of:
   a central metal core; and
   at least an inner and outer sheath; and
  at least one waterjet nozzle positioned after said exit end of said supporting surface, such that water can be made to eject therefrom in the region after said exit end of said first cable trough supporting surface;
 said power cable being placed on said first cable trough supporting surface so that a leading portion thereof extends beyond the exit end thereof;
 b) causing said at least one waterjet nozzle to direct a jet of water onto said leading portion of said power cable that extends beyond said exit end of said first cable trough supporting surface.

\* \* \* \* \*